(12) United States Patent
Hansen et al.

(10) Patent No.: US 10,914,623 B2
(45) Date of Patent: Feb. 9, 2021

(54) CUT WIRE DETECTION SYSTEM, METHOD, AND COMPUTER PROGRAM PRODUCT

(71) Applicant: SENSUS SPECTRUM, LLC, Raleigh, NC (US)

(72) Inventors: Adam D. Hansen, Cary, NC (US); Anup Nandwana, Goleta, CA (US)

(73) Assignee: SENSUS SPECTRUM, LLC, Raleigh, NC (US)

( * ) Notice: Subject to any disclaimer, the term of this patent is extended or adjusted under 35 U.S.C. 154(b) by 343 days.

(21) Appl. No.: 15/938,085

(22) Filed: Mar. 28, 2018

(65) Prior Publication Data

US 2019/0301916 A1    Oct. 3, 2019

(51) Int. Cl.
*G01F 15/00*    (2006.01)
*G01F 15/06*    (2006.01)

(52) U.S. Cl.
CPC .......... *G01F 15/007* (2013.01); *G01F 15/063* (2013.01)

(58) Field of Classification Search
CPC ..... G01F 15/007; G01F 15/063; G01R 31/50; G01R 21/133; H01L 29/0603; H01L 23/522; A61N 2/002; G01N 37/005
USPC ...... 324/110, 207.11–207.25, 200, 233, 600, 324/617, 622, 631, 500, 521, 683, 709, 324/66, 76.11, 76.52–76.77, 86, 10
See application file for complete search history.

(56) References Cited

U.S. PATENT DOCUMENTS

| | | |
|---|---|---|
| 4,337,466 A | 6/1982 | Spahn |
| 4,574,266 A | 3/1986 | Valentine |
| 4,707,679 A | 11/1987 | Kennon et al. |
| 4,868,566 A | 9/1989 | Strobel et al. |
| 5,034,648 A | 7/1991 | Gastgeb |
| 5,111,407 A | 5/1992 | Galpern |
| 5,181,241 A | 1/1993 | Strobel et al. |
| 5,227,668 A * | 7/1993 | Mutch .................. G01R 22/066 307/131 |
| 5,473,322 A | 12/1995 | Carney |

(Continued)

OTHER PUBLICATIONS

International Search Report and Written Opinion issued in counterpart PCT Application No. PCT/US2019/024193 dated Jun. 18, 2019 (nine (9) pages).

*Primary Examiner* — Melissa J Koval
*Assistant Examiner* — Trung Nguyen
(74) *Attorney, Agent, or Firm* — Olive Law Group, PLLC; Ronald A. Rudder

(57) ABSTRACT

A system (with corresponding a method and computer program product) for sensing wire tampering of a utility service. The system comprises a flow meter configured to produce output pulses indicative of a flow through the utility service, a switching-element receiving the pulses from the flow meter, a diode in parallel with the switching-element, and a processor for recording the flow, and having a first wire and a second wire electrically connected to the switching-element and the diode. The processor is configured to apply a forward voltage to the diode, detect a response at the diode during the application of the forward voltage to the diode, and based on a comparison of a magnitude of the response to at least two of three different electrical states, determine if the detected response is indicative of a) a short between the first wire and the second wire, b) a cut in either of the first wire and the second wire, or c) an untampered wire condition.

19 Claims, 5 Drawing Sheets

(56) References Cited

U.S. PATENT DOCUMENTS

| | | | |
|---|---|---|---|
| 5,898,387 A | 4/1999 | Davis et al. | |
| 6,067,476 A | 5/2000 | Siler | |
| 6,086,292 A | 7/2000 | Yokoyama | |
| 6,118,269 A | 9/2000 | Davis | |
| 6,232,886 B1 | 5/2001 | Morand | |
| 7,642,747 B2 | 1/2010 | Morioka et al. | |
| 9,275,543 B2 | 3/2016 | Oswalt | |
| 9,513,147 B2 | 12/2016 | Frey et al. | |
| 2005/0116584 A1 | 6/2005 | Federman | |
| 2017/0283239 A1* | 10/2017 | Carapelli | B67D 7/08 |

* cited by examiner

CUT WIRE DETECTION SYSTEM, METHOD, AND COMPUTER PROGRAM PRODUCT

BACKGROUND OF THE INVENTION

Field of the Invention

The present invention relates to a system and method for sensing the tampering of wires.

Description of the Related Art

In the field of water meters, water meters typically include an odometer that identifies the consumption of the water consumed. The odometer is read periodically and the difference between the present and the prior reading determines the amount of utility water used. For example, if the most recent water meter reading was 2 million gallons or liters and the previous water meter reading was 1.8 million gallons or liters, then 200,000 gallons or liters of water were consumed.

Background measuring systems have included that of U.S. Pat. No. 4,868,566 (the entire contents of which are incorporated herein by reference) which describes a metering element which engages a spring member to affect a gradual bending movement in one direction followed by a rapid return movement during which a pulse signal is developed by a piezoelectric material on the spring member. Energy was absorbed during each such rapid return movement of the spring member to provide damping, inhibit oscillations and effect reliable generation of a single pulse signal which is applied to an amplifier for transmission to a monitoring station.

Background measuring systems have included that of U.S. Pat. No. 5,034,648 (the entire contents of which are incorporated herein by reference) which describes a piezo film switch comprising a cantilever with a pair of layers including a piezo film layer and a flexible backing layer laminated there to. The piezo film layer produced a positive or negative output pulse depending upon a direction of deflection of the cantilever. Interface circuitry coupled to the piezo film layers was powered by the output pulses and provided pseudo contact closures which emulated the operation of a mechanical switch.

Systems have also been developed for the remote reading of water meters as described in U.S. Pat. No. 5,111,407 (the entire contents of which are incorporated herein by reference) entitled "System for Measuring and Recording a Utility Consumption." In this particular arrangement, a meter reader was placed in close proximity to a transponder for a meter reading. Subsequently, meter reading systems have evolved whereby the systems are either connected to telephone lines and/or transmitters which transmit radio waves to a central location.

U.S. Pat. No. 6,067,476 (the entire contents of which are incorporated herein by reference) describes an apparatus to detect tampering with a totalizing device on a fuel dispenser with a totalizing device acting to keep a running total of fuel dispensed from the fuel dispenser. The totalizing device included an electric circuit containing at least one coil that will emit a magnetic pulse and a magnetic sensitive device for sensing the presence of the magnetic pulse associated with the electrical circuit and generating a signal responsive thereto. In the '476 patent, the magnetic sensitive device included a reed switch. In the '476 patent, the magnetic sensitive device included a solid state magnetic proximity sensor.

More recently, sophisticating measuring systems have been developed to measure the flow of water. For example, U.S. Pat. No. 9,513,147 (the entire contents of which are incorporated herein by reference) describes a flowmeter comprising a piezoelectric sensor. The flowmeter in the '147 patent was configured so that fluid flow through a channel, typically either a fluid conduit or a housing in which the sensor is oriented, produces oscillating stresses in a piezoelectric material. The oscillating stresses produced an electric signal. Characteristics of the electric signal, such as the magnitude of the signal at particular frequencies, were measured and used to determine the rate of fluid flow through the channel.

However, in general, the reliability of measuring systems to accurately report water utilization depended and depends on the assumption that the water meter (or its register) has not been tampered with. Accordingly, in this field and others, there exists a need for a system (or device or method) for monitoring the operating condition (open, shorted, or operational) of an electrical device or a load. To this end, various monitoring techniques have been developed. One of the earliest of such systems involved the use of reed relays which would be closed by the electromagnetic force produced by the current drawn by an electrical load. In the event of an interruption of the load (loss of load for example), the reed relay would open a switch, resulting in an indication of a load fault.

U.S. Pat. No. 4,337,466 (the entire contents of which are incorporated herein by reference) describes a tamper protection circuit which provides a warning at a central station upon the disconnecting or tampering with a remote utility meter. Tamper protection was provided for the meter and for a transmission line carrying energy usage information to a transponder such that any interruption of the circuit path causes an alarm to be generated. The circuitry included an encoder associated with each remote meter to be protected and a centrally located decoder for receiving the signal transmitted by the encoder.

U.S. Pat. No. 4,574,266 (the entire contents of which are incorporated herein by reference) describes a microcomputer controlled system and method for detecting an electrical open, shorted or average condition on an electrical load. In the '266 patent, a load switch circuit coupled the load to a common voltage line and was controlled by a single drive from a microcomputer controlled load monitor circuit.

U.S. Pat. No. 5,181,241 (the entire contents of which are incorporated herein by reference) describes a data transmission system which uses a malfunction detection circuit for detecting malfunction conditions between a data transmitting station and a data receiving station connected with first and second data transmission lines. The malfunction circuit sensed a data signal of a first polarity for a preselected duration and provided an output signal when the data signal exceeds the preselected duration. The circuit also supplied a detection signal of a second preselected duration in a polarity opposite the data signal and detects the presence of or the absence of the detection signal. The circuit thereafter provided an output signal indicative of the malfunction condition when the absence of the detection signal exceeds the second preselected duration.

U.S. Pat. No. 5,898,387 (the entire contents of which are incorporated herein by reference) describes a modular meter based utility gateway enclosure which results between a power meter and a power socket of a residence or other building support. The gateway enclosure supported one or more interdiction cards, and included a tamper proof mechanism to prevent unauthorized tampering with the enclosure.

U.S. Pat. No. 6,118,269 (the entire contents of which are incorporated herein by reference) describes an electric meter tamper detection system for sensing removal of an electric meter from a corresponding meter socket and for generating a tamper signal. In the '269 patent, a light emitting diode was electrically coupled to a resistor and to a load-side of a conductor having current normally flowing therethrough. A transistor received a tamper signal from the light emitting diode when the electric meter is removed from the meter socket.

U.S. Pat. No. 6,232,886 (the entire contents of which are incorporated herein by reference) describes a method and apparatus which facilitate improved sensing of tampering of an electrically powered device, such as an electric watt-hour meter installed at a residence for metering the amount of electric energy consumed at the residence. In the '886 patent, removal of the electric meter from its power socket interrupted power to the meter. The method and apparatus sensed motion of the meter and set a "tamper flag" in a non-volatile memory, which was cleared if there is no loss of power to the meter within the predetermined period of time.

U.S. Pat. No. 7,642,747 (the entire contents of which are incorporated herein by reference) describes a battery pack capable of detecting tampering which is provided with a current cut off device connected in series with batteries. In the '747 patent, a tamper detection detector detected tampering and issued a tamper signal. In particular, the tamper detector detected battery replacement from a change in battery electrical characteristics, and issued a tamper signal when battery replacement is concluded.

U.S. Pat. No. 9,275,543 (the entire contents of which are incorporated herein by reference) describes systems and methods for detecting tampering with a pulse-producing component of an electrical device. One electrical device of the '543 patent included a pulse-producing circuit and a tamper detection circuit. The pulse-producing circuit was configured for generating at least one pulse. The pulse-producing circuit included a pulse interface via which the at least one pulse was communicated from the pulse-producing circuit. The tamper detection circuit of the '543 patent was configured for communicating the pulse to the pulse-counting device via at least one electrical path in the absence of a tampering condition. The tamper detection circuit was also configured for simulating damage to the pulse interface by modifying the at least one electrical path in response to the presence of the tampering condition.

US 2005/0116584 (the entire contents of which are incorporated herein by reference) describes an electronic switch in which pressure applied to a pressure transducer acts to close a pair of power transistors. The transistors each included a gate terminal in the form of a capacitor so that no external pairing of the switch components was required, only potentials generated by the transducer. The drain and source terminals of the transistors were connected in antiserial configuration between the switch connections of the switch.

SUMMARY OF THE INVENTION

In one embodiment, there is provided a system for sensing wire tampering of a utility service. The system comprises a flow meter configured to produce output pulses indicative of fluid flow through the utility service, a switching-element receiving the pulses from the flow meter, a diode in parallel with the switching-element, and a processor for recording the fluid flow, and having a first wire and a second wire electrically connected to the switching-element and the diode. The processor is configured to: apply a forward voltage to the diode, detect a response at the diode during the application of the forward voltage to the diode, and based on a comparison of a magnitude of the response to at least two of three different electrical states, determine if the detected response is indicative of a) a short between the first wire and the second wire, b) a cut in either of the first wire and the second wire, or c) an untampered wire condition.

In one embodiment, there is provided a method for sensing wire tampering of a utility service. The method comprises applying a forward voltage to a diode associated with a switching element receiving the pulses from the flowmeter indicative of fluid flow through the utility service, detecting a response at the diode during the application of the forward voltage to the diode, and determining based on a comparison of a magnitude of the response to at least two of three different electrical states if the detected response is indicative of a) a short between the first wire and the second wire, b) a cut in either of the first wire and the second wire, or c) an untampered wire condition.

In one embodiment, there is provided a computer program product for sensing wire tampering of a utility service. The computer program product contains a program which when executed on a computer or a processor applies a forward voltage to a diode associated with a switching element receiving pulses from a flowmeter, detects a response at the diode during the application of the forward voltage to the diode, and determines based on a comparison of a magnitude of the response to at least two of three different electrical states if the detected response is indicative of a) a short between the first wire and the second wire, b) a cut in either of the first wire and the second wire, or c) an untampered wire condition.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

As noted above, one problem that is faced by a utility is that the water utility meters including their registers and associated electronics for measuring water flow can be tampered with so that the actual amount of water having passed through the meter is not properly counted.

The invention pertains to a system and method for sensing wire tampering of a utility service or other electrical device where the existence of a short between the first wire and the second wire, a cut in either one of the wires in electrical communication between a transmitting device and a receiving device, or c) an untampered wire condition. Accordingly, while illustrated below with regard to the registration of water flow, the present invention has utility to any systems relying on one or more wires for electrical communication between a transmitting device and a receiving device, where the tampering or the integrity of the lines needs to be monitored or checked. The systems described below can determine the status of lines between utility registers monitoring the fluid flow of water, gas or other neutral fluids and respective counters recording the fluid flow. However, the systems described below can also determine the status of lines between registers monitoring electricity consumption (electrical current flow) respective counters recording the electrical current flow, provided there are at least two wires of communication between one of the electrical registers and a specific counter recording the electrical current flow.

Figure 1A:
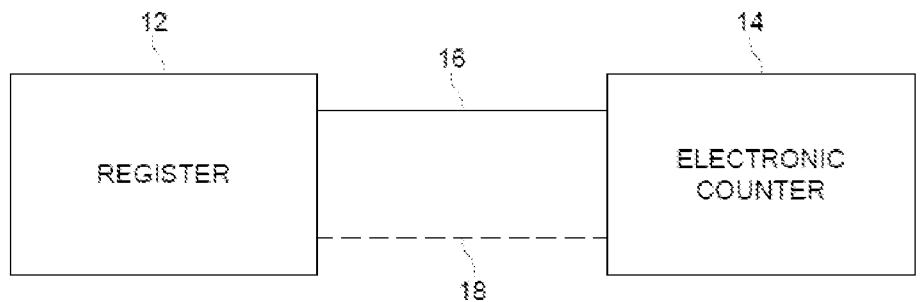
FIG. 1A is a schematic of a two-wire communication between a register and an electronic counter.

FIG. 1A is a schematic of a two-wire communication between a register and an electronic counter. As shown in FIG. 1A, a register 12 communicates with an electronic counter 14 by way of at least two wires 16, 18. One way to prevent the recording of water flow would be to cut one or both wires 16, 18 between the register 12 and the electronic counter 14. This would prevent the electronic counter 14 from detecting the water flow, but the register 12 would still increment correctly. Conventional cut wire detection circuits used in the field at the time of this invention utilize three wires: a pair for water flow measurements, one of which is grounded, and then a third tamper wire which is connected to the ground wire at the register 12. These wires are typically wound, bundled, or molded together. A small flow of current to ground on the third tamper wire indicates that the tamper wire is intact. If the third tamper wire cable is cut, then the third tamper wire is no longer connected to ground, and a tamper circuit detects that a small flow of current to ground no longer exists. However, there are registers being used in the field at the time of this invention that do not have a third wire. It is also possible to cut just one of first pair of wires which is non-grounded and prevent the counting of pulses without setting off the conventional tamper alarm. In those situations, the conventional approach cannot be used.

Figure 1B:
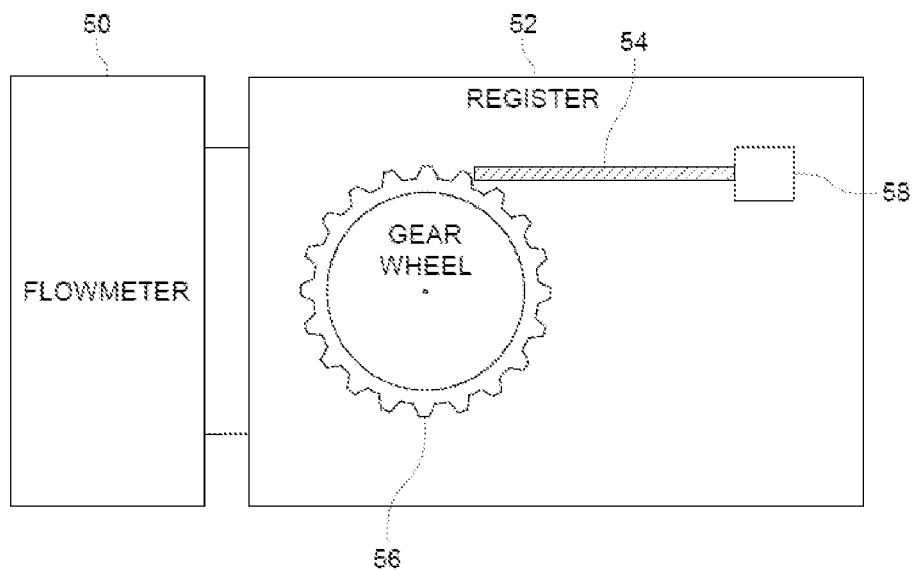
FIG. 1B is a schematic of a piezoelectric counter for a register producing output pules from water flow through a meter.

In one embodiment of the invention, a flow meter 50 is attached to a water register 52. FIG. 1B is a schematic of a piezoelectric counter producing output pules from water flow through the meter 50. As shown in FIG. 1B, the gear wheel 56 has gear teeth on the periphery of the gear wheel. Water flow in meter 50 drives the rotation of the gear wheel 56 in the register 52. The register 52 comprises a piezoelectric counter 54 which bends and reciprocates in response to the gear wheel turning. The piezoelectric counter 54 has a support 58 fixing on end of the piezoelectric counter. The other end of the piezoelectric counter 54 engages the gear teeth such that, as the gear wheel turns, the piezoelectric counter 54 bends as the engaging end slides in and out of the gear teeth, thereby flexing the piezoelectric counter and producing output voltage pulses.

In other systems, as water flows through the meter, a rotor with a magnet mounted on it turns. The magnet can be positioned on a dial (or drum in some cases) that rotates due to water flow. A pulse output can be accomplished with a single pole, single throw dry contact reed switch, which is normally open. The switch closes when the rotating magnet passes close enough to pull the reed to a closed position. When the magnet moves away, the reed is released, and the switch opens. The closure and opening of the reed switch makes for a single output "pulse." The register detects the rotations of the magnet, and registers water flow based on the number of times the magnet rotates. Information related the rotation of the magnet is conveyed to an electronic counter via at least a two-wire connection between the register and the electronic counter.

In other systems, water flow results in a wheel rotating inside the register. The wheel has a bump that closes a contact every time it completes one revolution. If there were two bumps, there would be two output pulses per revolution. The number of shaft rotations can be recorded by simply counting the output pulses.

Circuit Description

Figure 2:
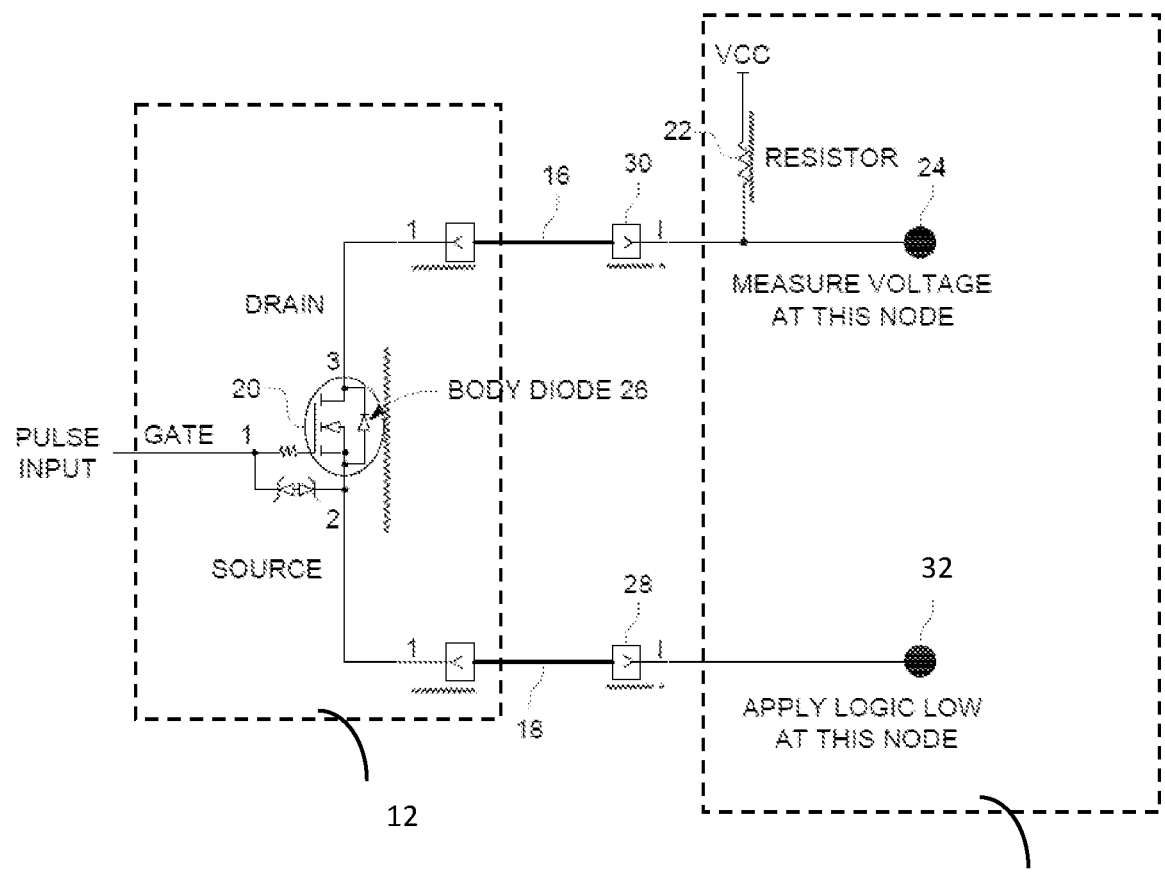
FIG. 2 is a schematic according to one embodiment of the invention showing a configuration where the register has a source and a drain of a FET connected respectively to a pair of wires in electrical communication with the electronic counter.

A more detailed representation of the circuitry involved in the interface between the register 12 and the electronic counter 14 is shown in FIG. 2. FIG. 2 is a schematic according to one embodiment of the invention where the register 12 has a source 2 and a drain 3 of a FET 20 connected to the pair of wires 16, 18 in electrical communication with the electronic counter 14 (details of which are not shown in FIG. 2 for the sake of simplicity). As described above, water flow in the meter results in output pulses. As shown, the output pulses are supplied to gate 1 of FET 20 with a magnitude sufficient to momentarily turn on FET 20. Electronic counter 14 supplies a drain-source voltage and counts pulses of current flow when FET 20 is momentarily turned on. As shown in FIG. 2, a voltage drop across a resistor 22 can be measured at node 24, indicative of the pulses of current flow. While described above as a FET in this embodiment, other switching elements such as reed switches, bipolar transistors, and optical switches may be used.

In one example of normal operation, gate 1 on the FET 20 is energized ten (10) times for each complete rotation of the meter magnet. Each time the gate is energized, FET 20 will present a short circuit (7.5 ohms) between the two wires 16, 18. The duration of the short circuit can be from 5 to 100 msec, 10 to 50 msec, or 15 to 75 msec. During this time, electronic counter 14 presents a logic low onto the source pin of FET 20. The electronic counter 14 monitors the voltage at node 24. The electronic counter 14 detects and counts the number of instances that the short circuit occurs and converts this count to a volume measurement.

More specifically, if FET 20 is turned off with no pulses applied to the gate of FET 20, no current passes through the FET 20. In that case, the voltage at measurement node 24 across resistor 22 would remain at a logic high. When a voltage pulse is applied to the gate of FET 20, for example by rotation of a meter magnet as discussed above, the conduction path between the drain-source of FET 20 is turned on. Current flows from VCC through resistor 22 through the drain of FET 20 and to the source side of FET 20. This current flow through FET 20 will pull the voltage at measurement node 24 close to 0 V, or a logic low level, as the resistance of resistor 22 is substantially higher than the resistance of FET 20 when turned on. This transition from a logic high to a logic low at measurement node 24 permits the electronic counter 14 to count how many times the FET is energized. As noted above, the electronic counter 14 converts the count into water volume. The body diode 26 of the FET is reverse biased during normal operation—meaning no current flows through the diode.

Operational Description—Tamper Mode

Figure 3:
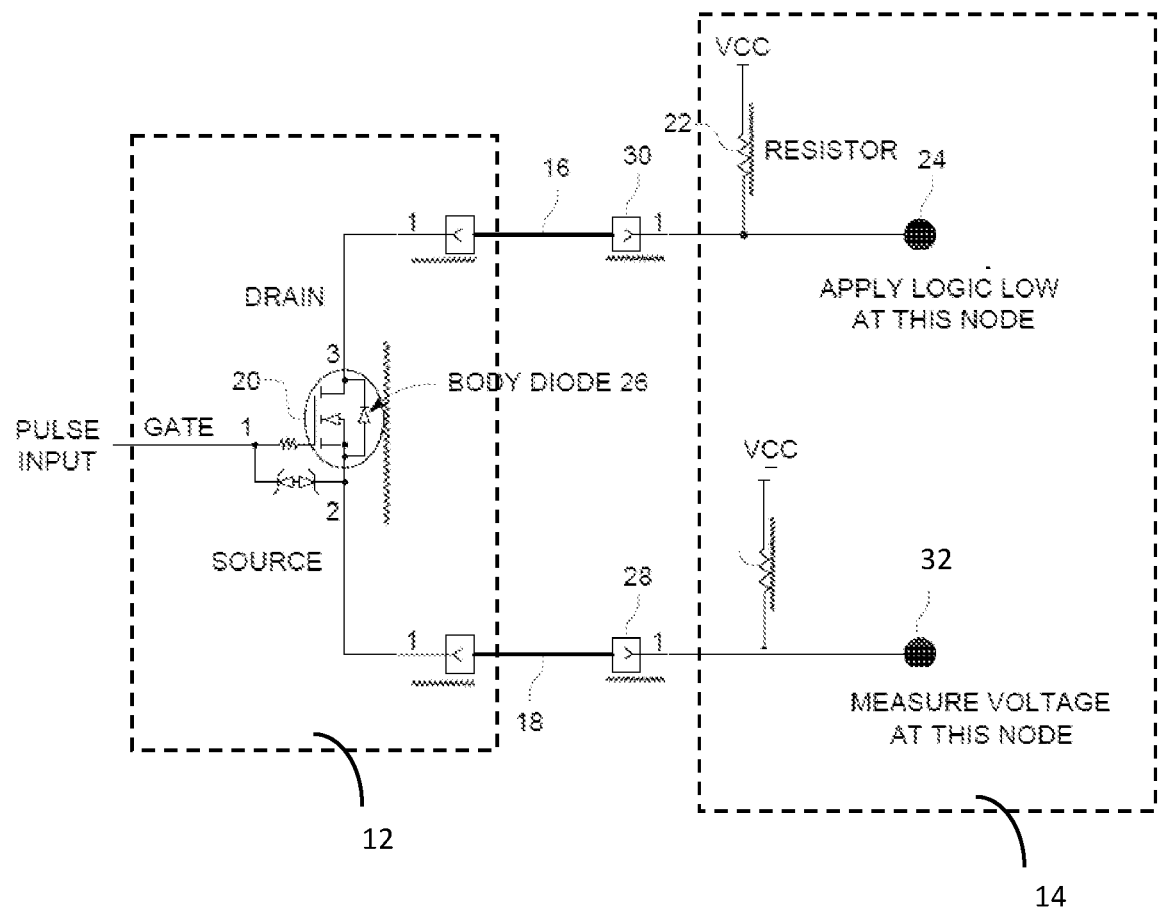
FIG. 3 is a schematic illustrating operation of a by-pass diode by-passing a switching element of the invention.

FIG. 3 is a schematic illustrating operation of by-pass diode 26 according to an embodiment of the invention for assessing if there has been tampering with the wires 16, 18. In one embodiment of the invention, in order to determine if there has been tampering with two wires 16, 18 (e.g., resulting in the two wires being shorted together or either one being cut), a reverse voltage signal is temporarily applied to FET 20 and diode 26.

In one embodiment of the invention, the FET has a built-in or body diode 26 which can be used for the testing of the two wires. In one embodiment of the invention, a separate diode from the FET (or another switching element) can be used for the testing of the integrity of the two wires.

In one embodiment of the invention, electronic counter 14, via for example discrete circuit elements, can apply to node 28 a positive voltage to wire 18 connecting to source 2. In addition or alternatively, electronic counter 14 can apply via node 30 a negative voltage (or ground) to wire 16 connecting to drain 3. The discrete circuit elements preferably apply the voltage signal from a current limited source to protect the circuit elements in the case of a short-circuit load. An analog to digital converter located internal to electronic counter 14 can then monitor the voltage at the wire 18 that connects to the source 2 of FET 20 via node 28 or 32. Since the body diode 26 is forward biased, current will flow through it regardless of the amount of charge present on the gate 1 of FET 20. With current flow, there should be a voltage drop of approximately 0.3 V to 0.7 V across the terminals if the two wires 16, 18 are intact. If the FET is shorted or missing, then the voltage measured at node 32 should be approximately 0 or full voltage, respectively.

If current is flowing through the body diode 26 (or a separate diode), the wires 16, 18 are intact, and the voltage measured at node 32 will be approximately 0.3 V to 0.7 V DC. If no current is flowing, then one of the wires 16, 18 has been cut (or potentially the diode inside the register has failed), and the voltage measured at node 32 will be approximately full voltage.

If the wires have been cut and shorted together, current will flow, and the voltage measured at node 28 will measure approximately 0.05 V DC.

The following table indicates a set of exemplary voltages under different circuit conditions:

TABLE 1

| Circuit Status (Gate Off/Forward Bias on Diode) | At node 28 or 32 |
| --- | --- |
| Wires Intact (normal) | 0.3 V to 0.7 V |
| Cut Wire | full bias voltage |
| Shorted Wires | 0 to 0.25 V |

Accordingly, in one embodiment of the invention, the following determinative conditions exist:
if the response at the diode during the application of the forward voltage to body diode 26 (or a separate diode) is approximately equal to the forward voltage, at least one of the first and second wires is open;
if the response at the diode during the application of the forward voltage is approximately zero and remains at zero beyond a period of the output pulse, at least one of the first and second wires is shorted; and
if the response at the diode during the application of the forward voltage is greater than zero and less than the forward voltage, the first and second wires are intact.

The voltage values given above are merely illustrative of different embodiments and not limiting of the invention.

External Communication

Figure 4:
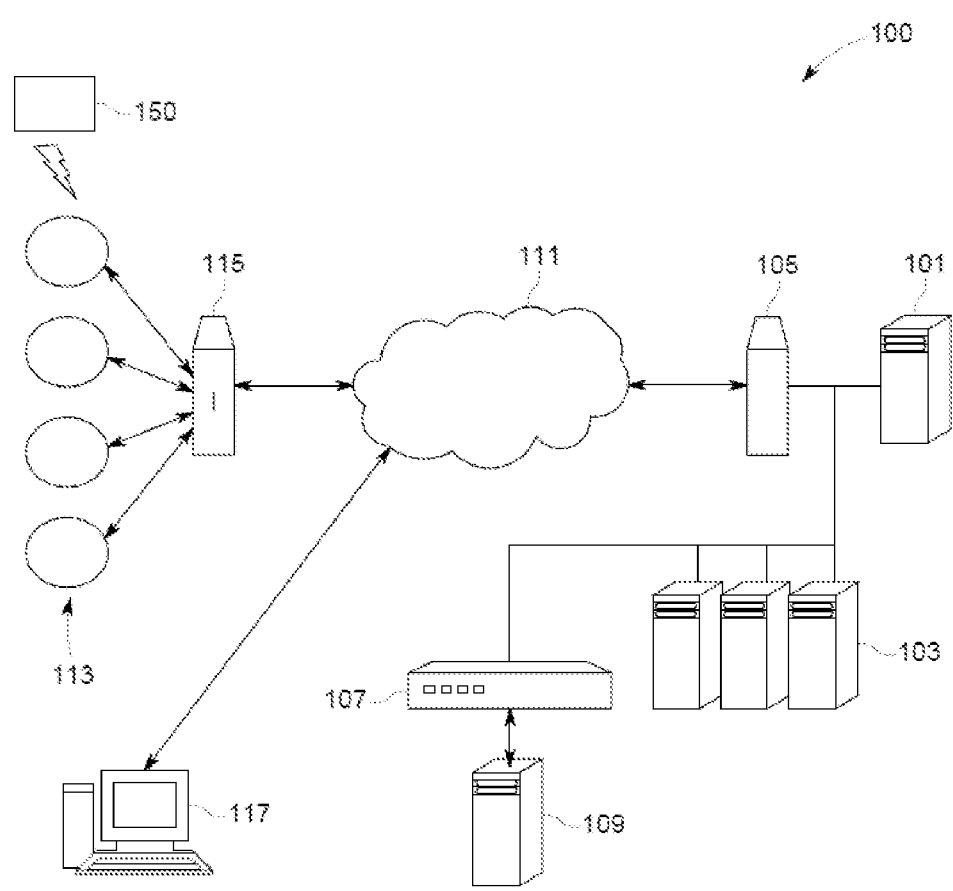
FIG. 4 is a schematic depicting a communication system by which utility boxes (containing the register and the electronic counter) communicate to a utility server via a controller.

In accordance with the invention, FIG. 4 depicts a communication system 100 by which for example utility boxes 113 (containing the register 12 and the electronic counter 14) can communicate to a utility server 101 via a controller 115. Utility server 101 can be coupled to a data center 103 that includes databases where acquired data from the electronic counter 14 or externally acquired data can be stored and optionally time-stamped.

System 100 may be coupled via a firewall 105 to a wired or wireless network 111 which communicates to utility boxes 113. System 100 can also be accessed via protective firewalls 107 protecting a utility company's virtual private network 109. Bi-directional communication may occur between each utility box 113 and system 100 via point of presence (POP) 115. In addition, Internet communication devices such as personal computer 117 (or smart phone) may access utility boxes 113 and system 100.

The hardware design is not limiting of this invention, and may comprise controller 115 with a memory, a liquid crystal display or other known displays, a directional sensing infrared disk interface, an infrared data association (IrDA) communications port for diagnostics, non-volatile memory for data reading/storage, a real-time clock for time stamping of data measurements, and a serial port to interface with various wired or wireless communication modules. Controller 115 can include processor 50 or a functional equivalent thereof, such as a central processing unit (CPU) and/or at least one application specific processor (ASP). Controller 115 (or processor 50) may include one or more circuits or be a circuit that utilizes a computer readable medium, such as a memory circuit (e.g., ROM, EPROM, EEPROM, flash memory, static memory, DRAM, SDRAM, and their equivalents), configured to control the processor to perform and/or control the processes and systems of this disclosure. The computer readable medium can include the methods and algorithms discussed therein as well as data log files.

In one embodiment of the invention, instructions from processor 50 and information regarding alerts, alarms, and historical data can be transmitted to mobile controller 115 for communication to an installer or service technicians. In a complex where there are multiple utility boxes of the present invention, controller 50 may be a stationary work station monitored or monitorable by site personnel or remotely monitored by the utility provider.

Each utility box 113 is capable of monitoring the tamper-state of the register 12 and the electronic counter 14. Additionally, data such as utility usage readings, or long term drifts in the voltages of the normal state noted above can be taken at programmed predetermined intervals and can be stored in a non-volatile memory at the box 113 or the utility server 101. As such, each utility box 113 (containing the register 12 and the electronic counter 14) can periodically establish a link to system 100.

Computerized Method of the Invention

Figure 5:
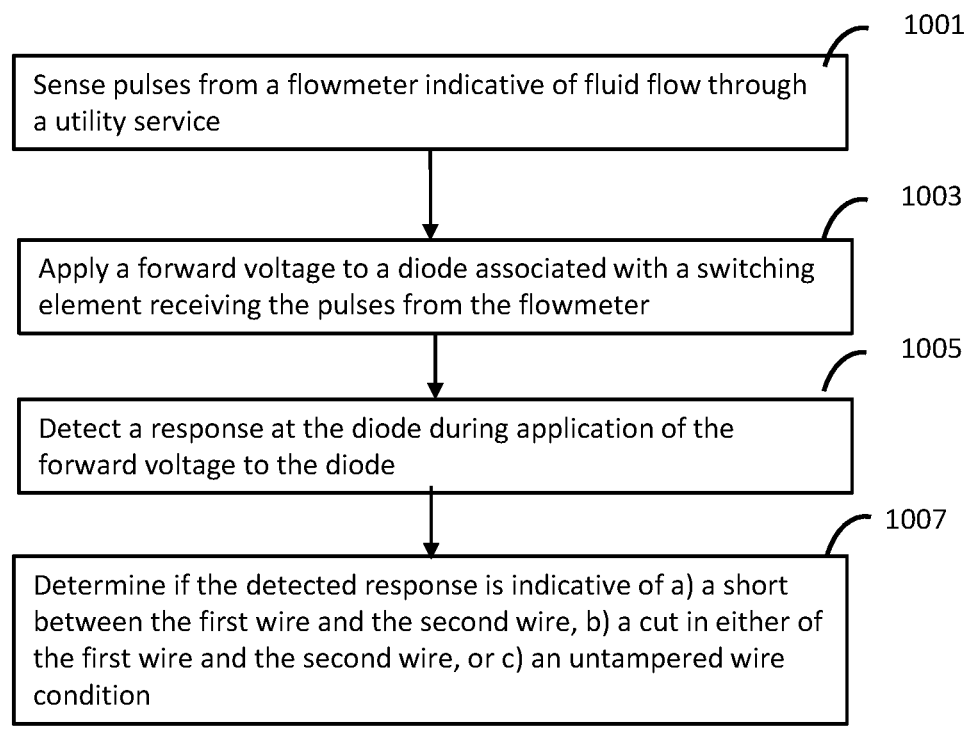
FIG. 5 is a flowchart depicting a method of the invention for sensing wire tampering.

FIG. 5 is a flowchart depicting a computerized method of the invention for sensing wire tampering of a utility service.

At step 1001, the method comprises optionally sensing pulses from a flowmeter indicative of fluid flow through the utility service. At step 1003, the method comprises applying a forward voltage to a diode associated with a switching element (e.g., a transistor or a Reed switch) receiving pulses from the flowmeter. At step 1005, the method comprises detecting a response at the diode during the application of the forward voltage to the diode. At step 1007, the method comprises determining (based on a comparison of a magnitude of the response) if the detected response is indicative of a) a short between the first wire and the second wire, b) a cut in either of the first wire and the second wire, or c) an untampered wire condition.

The computerized method embodied for example in electronic counter 14 or utility server 115 can provide communicate with a utility server.

The computerized method can store acquired data from the electronic counter 14 or externally acquired data. Regardless, the acquired data can be time-stamped. In one embodiment of the invention, historical entries of voltages across or electrical current flowing through the FET under normal conditions when the wires are intact are recorded. In one embodiment of the invention, historical entries of voltages across or electrical current flowing through the diode under normal conditions when the wires are intact are recorded.

The computerized method can detect the response voltage at the transistor during the application of the forward voltage to the diode on a periodic basis. Alternatively, the computerized method can detect the response at the diode during the application of the forward voltage to the diode when usage measured by the flowmeter is out of a normal range, such as no flow of water at a home over a twenty-four hour period or no flow of water at a factory over a two-hour time period. The invention is not limited to the above-noted twenty-four hour and two-hour time periods, and other time periods can be programmed in the processor.

In one embodiment, there is provided a computer program product embodied in the computer readable medium, such as a memory circuit (e.g., ROM, EPROM, EEPROM, flash memory, static memory, DRAM, SDRAM, and their equivalents (noted above) for sensing wire tampering of a utility service. The computer program product contains a program which when executed on a computer or a processor records voltage pulse signals from a flowmeter configured to produce output voltage pulses indicative of fluid flow through the utility service, applies a forward voltage to a diode associated with a transistor (or switching element), detects a response at the diode during the application of the forward voltage to the diode, and determines if the detected response is indicative of a) a short between the first wire and the second wire, b) a cut in either of the first wire and the second wire, or c) an untampered wire condition.

In one embodiment, the computer program product programs the processor with a voltage response table setting forth first, second, and third voltages (i.e., three different voltage states) respectively for at least one of the first and second wires being open, for at least one of the first and second wires being shorted, and for the first and second wires being intact. For example, the voltage response table can have recorded thereon the first voltage ranging from 95 to 100% of the forward voltage applied across the diode, the second voltage ranging from 0 to 2% of the forward voltage applied across the diode, and the third voltage ranging from 5 to 30% of the forward voltage applied across the diode.

STATEMENTS OF THE INVENTION

The following numbered statements of the invention set forth generalized aspects of the invention.

Statement 1. A system for sensing wire tampering of a utility service (water, gas, oil, or other liquid or gaseous fluids), comprising a meter configured to produce output pulses (e.g., voltage pulses) indicative of fluid flow through the utility service, a switching-element receiving the pulses from the flow meter, a diode in parallel with the switching-element, and a processor for example recording the fluid flow (or consumption in the case of electricity), and having a first wire and a second wire electrically connected to the switching-element and the diode. The processor is configured to apply a forward voltage to the diode, detect a response at the diode during the application of the forward voltage to the diode, and based on a comparison of a magnitude of the response to at least two of three different electrical states, determine if the detected response is indicative of a) a short between the first wire and the second wire, b) a cut in either of the first wire and the second wire, or c) an untampered wire condition.

The inventive system does not necessarily have to include all of these elements, and the system does not need to include these elements in any particular order. For example, system may not necessarily include the flow meter, but may instead merely receive pulses from a flowmeter. For example, a system for sensing wire tampering does not necessarily have to sense wire tampering with a water or gas utility. Instead, a system of the invention could utilize the above-noted switching element such as a transistor, the above-noted diode, and/or processor to sense tampering on any two-wire connection. Moreover, while described above with regard to water, gas, oil, or other liquid or gaseous liquids, the systems described herein could be used to detect tampering of registers associated with electrical meters measuring consumption of electricity.

Statement 2. The system of statement 1, wherein the flow meter comprises a piezoelectric counter which reciprocates in response to fluid flow.

Statement 3. The system of statement 2, wherein the flow meter comprises a gear wheel driven by water flow in the flow meter, the gear wheel having gear teeth on the periphery of the gear wheel, and an end of the piezoelectric counter engages the gear teeth such that, in response to water flow, the end of the piezoelectric counter reciprocates in and out of the gear teeth, thereby flexing the piezoelectric counter and producing the voltage pulses indicative of the liquid or fluid flow.

Statement 4. The system of statement 1, wherein the switching element comprises a MOSFET transistor and the diode is a built-in diode integral to the MOSFET.

Statement 5. The system of statement 1, wherein the switching element comprises a MOSFET transistor and the diode is a component separate from the MOSFET.

Statement 6. The system of statement 1, wherein the response at the transistor or switching element during the application of the forward voltage to the diode is detected via a connection of the processor (e.g., to a source/drain contact of the MOSFET).

Statement 7. The system of statement 1, wherein: if the response at the transistor or switching element during the application of the forward voltage is approximately equal to the forward voltage, at least one of the first and second wires is open; if the response at the transistor during the application of the forward voltage is substantially zero and remains at substantially zero beyond a period of the output pulse, at least one of the first and second wires is shorted; and if the response at the transistor during the application of the forward voltage is greater than substantially zero and less than the forward voltage, the first and second wires are intact.

Statement 8. The system of statement 1, wherein the period of the output pulse from the flowmeter is between 5 to 100 msec.

Statement 9. The system of statement 1, wherein the processor stores programmed voltage responses (that is can have a voltage response table) setting forth first, second, and third voltages respectively for at least one of the first and second wires being open, for two wires being shorted, and for the first and second wires being intact.

Statement 10. The system of statement 9, wherein the first voltage is substantially the forward voltage applied across the diode, the second voltage is a near zero, and the third voltage is a substantial fraction of the forward voltage applied across the diode. Table 1 shows representative voltages for the first, second, and third voltages.

Statement 11. The system of statement 1, wherein the processor comprises discrete circuits providing the forward voltage to the diode.

Statement 12. The system of statement 1, wherein the processor comprises discrete circuits to measure the detected response.

Statement 13. The system of statement 1, wherein the processor comprises a connection to a server recording data associated with the utility service.

Statement 14. The system of statement 13, wherein the data comprises historical entries of voltages across the FET under normal conditions when the wires are intact.

Statement 15. The system of statement 13, wherein the data comprises historical entries of voltages across or current flowing through the diode under normal conditions when the wires are intact.

Statement 16. The system of statement 13, wherein, via the internet connection, alerts are provided to a utility provider when a tamper condition is determined.

Statement 17. The system of statement 1, wherein the processor is programmed to periodically determine a status of the first and second wires.

Statement 18. The system of statement 1, wherein the processor is programmed to detect the response at the diode during the application of the forward voltage to the diode when the fluid flow measured by the flowmeter is not in a normal range.

Statement 19. A system for sensing wire tampering of a utility service, comprising a flow meter configured to produce output pulses indicative of fluid flow through the utility service, a switching-element receiving the pulses from the flow meter, a diode in parallel with the switching-element, and a processor for recording the fluid flow, and having a first wire and a second wire electrically connected to the switching-element and the diode. The processor is configured to: apply a forward voltage to the diode, detect a response at the diode during the application of the forward voltage to the diode, and determine by the application of the forward voltage to the diode if the detected response is indicative of a) a short between the first wire and the second wire, b) a cut in either of the first wire and the second wire, or c) an untampered wire condition.

Statement 20. A method for sensing wire tampering of utility service (e.g., with any of the systems noted above), comprising: applying a forward voltage to a diode associated with a switching element receiving pulses from a flowmeter indicative of fluid flow through the utility service. detecting a response at the diode during the application of the forward voltage to the diode; and determining based on a comparison of a magnitude of the response to at least two of three different electrical states if the detected response is indicative of a) a short between the first wire and the second wire, b) a cut in either of the first wire and the second wire, or c) an untampered wire condition.

Statement 21. A computer program product including a computer readable medium for sensing wire tampering of a utility service (e.g., with any of the systems or the method noted above), the computer readable medium contains a program which when executed on a computer or a processor executes the following steps of: (optionally) recording pulse signals from a flowmeter configured to produce output pulses indicative of fluid flow through the utility service; applying a forward voltage to a diode associated with a switching element; detecting a response at the diode during the application of the forward voltage to the diode; and determining based on a comparison of a magnitude of the response to at least two of three different electrical states if the detected response is indicative of a) a short between the first wire and the second wire, b) a cut in either of the first wire and the second wire, or c) an untampered wire condition.

Numerous modifications and variations of the present invention are possible in light of the above teachings. It is therefore to be understood that within the scope of the appended claims, the invention may be practiced otherwise than as specifically described herein.

The invention claimed is:

1. A system for sensing wire tampering of a utility service, comprising:
   a flow meter configured to produce output pulses indicative of fluid flow through the utility service;
   a switching-element receiving the pulses from the flow meter;
   a diode in parallel with the switching-element; and a processor for recording the fluid flow, and having a first wire and a second wire electrically connected to the switching-element and the diode,
   wherein the processor is configured to:
   apply a forward voltage to the diode,
   detect a response at the diode during the application of the forward voltage to the diode, and
   based on a comparison of a magnitude of the response to at least two of three different electrical states, determine if the detected response is indicative of a) a short between the first wire and the second wire, b) a cut in either of the first wire and the second wire, or c) an untampered wire condition,
   wherein:
   if the response at the switching-element during the application of the forward voltage is approximately equal to the forward voltage, at least one of the first and second wires is open;
   if the response at the switching-element during the application of the forward voltage is substantially zero and remains at substantially zero beyond a period of an output pulse from the flow meter, at least one of the first and second wires is shorted; and
   if the response at the switching-element during the application of the forward voltage is greater than substantially zero and less than the forward voltage, the first and second wires are intact.

2. The system of claim 1, wherein the flow meter comprises a piezoelectric counter which reciprocates in response to the fluid flow.

3. The system of claim 1, wherein the switching-element comprises a MOSFET and the diode is a built-in diode integral to the MOSFET.

4. The system of claim 1, wherein the switching-element comprises a MOSFET and the diode is a component separate from the MOSFET.

5. The system of claim 1, wherein the response at the switching-element during the application of the forward voltage to the diode is detected via a connection of the processor.

6. The system of claim 1, wherein the period of the output pulse is between 5 to 100 msec.

7. The system of claim 1, wherein the processor stores programmed voltage responses setting forth at least two of first, second, and third voltages respectively for at least one of the first and second wires being open, for two wires being shorted, and for the first and second wires being intact.

8. The system of claim 7 wherein the first voltage is substantially the forward voltage applied across the diode, the second voltage is a near zero, and the third voltage is a substantial fraction of the forward voltage applied across the diode.

9. The system of claim 1, wherein the processor comprises discrete circuits providing the forward voltage to the diode.

10. The system of claim 1, wherein the processor comprises discrete circuits to measure the response voltage.

11. The system of claim 1, wherein the processor causes transmission of data to a server recording data associated with the utility service.

12. The system of claim 11, wherein the data comprises historical entries of voltages across the FET during operation.

13. The system of claim 11, wherein the data comprises alerts.

14. The system of claim 1, wherein the processor stores therein historical entries of voltages across the switching element during operation.

15. The system of claim 1, wherein alerts are provided to a utility provider when a tamper condition is determined.

16. The system of claim 1, wherein the processor is programmed to periodically determine a status of the first and second wires.

17. The system of claim 1, wherein the processor is programmed to detect the response at the diode during the application of the forward voltage to the diode when the fluid flow measured by the flowmeter is not in a normal range.

18. A system for sensing wire tampering of a utility service, comprising:
a flow meter configured to produce output pulses indicative of fluid flow through the utility service;
a switching-element receiving the pulses from the flow meter;
a diode in parallel with the switching-element; and a processor for recording the fluid flow, and having a first wire and a second wire electrically connected to the switching-element and the diode,
wherein the processor is configured to:
apply a forward voltage to the diode,
detect a response at the diode during the application of the forward voltage to the diode, and
determine by the application of the forward voltage to the diode if the detected response is indicative of a) a short between the first wire and the second wire, b) a cut in either of the first wire and the second wire, or c) an untampered wire condition,
wherein:
if the response at the switching-element during the application of the forward voltage is approximately equal to the forward voltage, at least one of the first and second wires is open;
if the response at the switching-element during the application of the forward voltage is substantially zero and remains at substantially zero beyond a period of an output pulse from the flow meter, at least one of the first and second wires is shorted; and
if the response at the switching-element during the application of the forward voltage is greater than substantially zero and less than the forward voltage, the first and second wires are intact.

19. A method for sensing wire tampering of a utility service, comprising:
applying a forward voltage to a diode associated with a switching element receiving pulses from a flow meter indicative of fluid flow through the utility service;
detecting a response at the diode during the application of the forward voltage to the diode; and
determining based on a comparison of a magnitude of the response to at least two of three different electrical states if the detected response is indicative of a) a short between the first wire and the second wire, b) a cut in either of the first wire and the second wire, or c) an untampered wire condition,
wherein:
if the response at the switching-element during an application of the forward voltage is approximately equal to the forward voltage, at least one of the first and second wires is open;
if the response at the switching-element during the application of the forward voltage is substantially zero and remains at substantially zero beyond a period of an output pulse from the flow meter, at least one of the first and second wires is shorted; and
if the response at the switching-element during the application of the forward voltage is greater than substantially zero and less than the forward voltage, the first and second wires are intact.

* * * * *